United States Patent [19]

Azizian

[11] Patent Number: 4,914,160

[45] Date of Patent: Apr. 3, 1990

[54] DEUTERATION OF UNSATURATED POLYMERS AND COPOLYMERS

[76] Inventor: Hormoz Azizian, No. 1210, 3620 Kaneff Crescent, Mississauga Ontario, Canada, L5A 3X1

[21] Appl. No.: 210,408

[22] Filed: Jun. 23, 1988

[51] Int. Cl.$^4$ ................................................ C08F 8/04
[52] U.S. Cl. .............................. 525/329.3; 525/332.8; 525/332.9; 525/333.1; 525/333.2; 525/338; 525/339
[58] Field of Search ................ 525/332.8, 332.9, 333.1, 525/333.2, 329.3, 338, 339

[56] References Cited

U.S. PATENT DOCUMENTS

| | | | |
|---|---|---|---|
| 2,109,495 | 1/1938 | Marks | 260/1 |
| 3,303,177 | 7/1967 | Natta et al. | 260/93.7 |
| 3,525,729 | 8/1970 | Gaeth | 260/94.3 |
| 3,700,637 | 10/1972 | Finch | 260/83.3 |
| 3,823,203 | 9/1974 | De La Mare | 260/876 B |
| 3,898,208 | 5/1975 | Krause | 260/85.1 |
| 4,207,409 | 10/1980 | Olandenberger et al. | 525/338 |
| 4,237,245 | 2/1980 | Halasa et al. | 525/339 |
| 4,337,329 | 6/1982 | Kubo et al. | 525/339 |
| 4,384,081 | 7/1983 | Kubo et al. | 525/339 |
| 4,452,950 | 5/1984 | Wideman | 525/339 |
| 4,452,951 | 5/1984 | Kubo et al. | 525/339 |
| 4,464,515 | 7/1984 | Rempel et al. | 525/338 |
| 4,503,196 | 5/1985 | Rempel | 525/338 |
| 4,673,714 | 6/1987 | Kishimoto et al. | 525/315 |

FOREIGN PATENT DOCUMENTS

| | | |
|---|---|---|
| 186106 | 2/1986 | European Pat. Off. . |
| 1558491 | 3/1980 | United Kingdom . |
| 8104757 | 3/1981 | United Kingdom . |

OTHER PUBLICATIONS

"Life Enhancement of Naval Systems Through Advanced Materials", NRL Memorandum Report 4807—A. I. Schindler et al./May 12/82.

"High-Temperature Deuterated Lubricants: Additives, Mechanisms & Methods" NRL Report 8779/Joseph E. Campana Dec. 30/83, pp. 17, 18–19.

"The Oxidation Stability of Deuterated Esters", Geo-Centers, Inc., Report No. GC-TR-83-182 of Jan. 83 for U.S. Naval Research Lab.

"Deuterated Polymers: Chemical and Physical Properties and Future Prospects", J. E. Campana et al., Oct. 16/85 Naval Research Lab. Report No. 8922.

Polymer Letters Edition–vol. 10, pp. 791–797, (1972), John Wiley & Sons Synthesis of Alternating 1,1,4,4–Tetradeuteriobutadiene Methacrylonitrile Copolymers and their Characterization by 300 MHz NMR Spectroscopy.

Polymer Journal–vol. 4, No. 4, pp. 358–365, (1973), Infrared Absorption Spectra of Alternating Copolymers of Butadiene with Acrylonitrile and Deuterated Analogues.

Macromulecules 1980, 13, 1302–1308. Vibrational Analysis of Trans-1,4–Polypentadiene. 2. Deuterio Derivatives and Interchain Interaction.

Primary Examiner—Bernard Lipman
Attorney, Agent, or Firm—Ridout & Maybee

[57] ABSTRACT

The addition of deuterium to poly(1,3-dienes) and to elastomeric copolymers of 1,3-conjugated dienes with vinyl monomers produces elastomeric materials having signficantly enhanced resistance to oxidation compared to either the hydrogenated or the untreated polymers.

10 Claims, 2 Drawing Sheets

DEUTERATION OF UNSATURATED POLYMERS AND COPOLYMERS

This invention relates to novel deuterated elastomeric polymer and copolymer compositions having enhanced oxidative stability, and to processes for their preparation.

In response to the demand of the oil drilling and automotive industries for elastomers capable of extended performance at elevated temperatures in the presence of air, oils and other aggressive media, a number of processes have been developed for the hydrogenation of acrylonitrilebutadiene rubbers (NBR) to produce highly saturated nitrile elastomers (HSN). The greater chemical stability and better resistance to high and low temperatures afforded by HSN compared to conventional NBR has been well documented and has led to commercial production of a number of elastomers such as THERBAN (Bayer AG), ZETPOL (Nippon Zeon Co.) and TORNAC (Polysar Limited).

Specific processes for the selective hydrogenation of various compositions of NBR, styrene-butadiene copolymers (SBR), styrene-butadiene-styrene block copolymers (SBS) and acrylonitrile-styrene-butadiene copolymers (ABS) are exemplified by U.S. Pat. Nos. 4,337,329 (Kubo et al.) and 4,464,515 (Rempel et al.) and by British patent No. 1,558,491 (Oppelt et al.).

Recent developments in high technology have also produced a requirement for high-temperature oxidatively stable lubricants. One approach which has been taken to the development of such materials is based upon the "deuterium isotope effect", i.e. the greater dissociation energy of the C-D bond compared with C-H. The results of research on deuterated lubricants was published by the Naval Research Laboratory in NRL Report 8779 (Dec. 30, 1983) entitled "High-Temperature Deuterated Lubricants: Additives, Mechanisms, and Methods". Ester lubricants such as pentaerythritol tetrahexanoate were found to provide greatly improved oxidative stability at levels of deuterium substitution of at least about 80 per cent of the hydrogen atoms.

It has now been found that the addition of deuterium to poly(1,3-dienes) and to elastomeric copolymers of 1,3-conjugated dienes with vinyl monomers to produce deuteriumsaturated analogues of the aforementioned HSN provide a significant increase in resistance to oxidation compared to either the untreated or the hydrogenated polymer. In polymers according to the present invention, this marked increase in oxidation resistance is achieved at the doublebond addition level of deuterium.

Ethylenically unsaturated rubbery polymers contain relatively little unsaturation. The most highly unsaturated polymer of the ethylenically unsaturated rubbers or elastomers referred to above is polybutadiene, containing one unsaturation for each [—CH$_2$—CH═CH—CH$_2$—] (backbone double bond from 1,4 addition) or

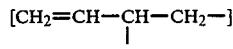

repeating unit (side chain double bond from 1,2 addition) repeating unit. On deuteration, two deuterium atoms are added to six hydrogen atoms present in a repeating unit, giving a deuterated polymer in which only 25 atom percent of the total number of hydrogen and deuterium atoms are deuterium. This contrasts with the earlier findings that at least about 80 percent of the hydrogen atoms in ester-based lubricants had to be replaced by deuterium atoms to obtain a significant increase in oxddative stability.

Experimental results detailed below show a substantial improvement in oxidation resistance of the deuterated over the hydrogenated composition for an NBR-type rubber containing 62 percent butadiene, corresponding to only 4.3 percent deuterium by weight. In polybutadiene, the most highly unsaturated member of the family of elastomers to which the present invention applies, saturation of olefinic linkages adds 6.9 percent deuterium by weight.

A particular advantage of deuterated polymers and copolymers according to the invention is that they may be prepared using already-existing hydrogenation apparatus to produce elastomers having improved resistance to oxidation, as described below.

With a view to the provision of synthetic rubbers having improved resistance to oxidation, the invention is in one of its aspects an elastomeric addition copolymer of a vinyl monomer and a 1,3-conjugated diene, selectively deuterated to saturate between about 50 percent and about 100 percent of the ethylenic double bonds on the diene units incorporated in the polymer structure. In a preferred embodiment, copolymers of butadiene with acrylonitrile and/or styrene are selectively deuterated to provide deuterated NBR, SBR, SBS or ABS-type elastomers.

In another of its aspects the present invention relates to selectively deuterated homopolymers of butadiene and isoprene, wherein between about 50 percent and about 100 percent of the ethylenic double bonds are saturated by deuterium.

In a further aspect, the invention is a process for preparing an elastomeric polymer, wherein deuterium is selectively added to the olefinic double bonds of an elastomeric polymeric material selected from the group consisting of polybutadiene, polyisoprene, acrylonitrile-butadiene copolymers, styrene-butadiene copolymers, styrene-butadiene-styrene block copolymers and acrylonitrile-styrene-butadiene copolymers. Deuterium is added until between about 50 percent and about 100 percent of the olefinic double bonds of the elastomeric polymeric material have been saturated.

Deuterated compositions according to the invention can be prepared by the deuteration of natural or synthetic homopolymers or copolymers of conjugated dienes. Such polymers or copolymers contain ethylenic unsaturation in their backbone or side chains deriving from the incorporated diene units. With a view to the economic use of deuterium and the production of product in which substantially all of the ethylenic double bonds are saturated with deuterium, it is prefereed to carry out deuteration in a homogeneous reaction, wherein a conventional hydrogen atom catalyst and the polymer to be deuterated are dissolved in a solvent and reacted under pressure with deuterium gas, typically in an autoclave. Heterogeneous catalyst systems generally are incapable of achieving the 100 percent saturation level at which weathering resistance of the product is maximized.

The unsaturated polymers which are deuterated to produce elastomers according to the invention are elastomeric homopolymers of conjugated dienes or elastomeric copolymers of suitable conjugated dienes with suitable vinyl monomers. Such copolymers may be of random, alternating or block structure. Suitable conjugated dienes include $C_4$–$C_6$ conjugated dienes, such as butadiene and isoprene. Suitable vinyl monomers include acrylonitrile and methacrylonitrile, styrene and methylstyrene, acrylic acid and methacrylic acid and the lower alkyl esters thereof, and vinyl esters such as vinyl acetate.

For use in practical applications as oxidation-resistant rubbers, polymers according to the invention may be compounded, reinforced, and vulcanized using suitable methods well known in the synthetic rubber art. A useful discussion of such methods relating particularly to NBR rubbers is given in the article "Nitrile Elastomers" at pp. 169–187, the Vanderbilt Rubber Handbook, the disclosure of which is incorporated herein by reference for its teachings on processing and applications of nitrile rubbers.

Ethylenically unsaturated rubbers or elastomers are conventionally employed for gaskets, linings of chemical vessels, tires and the like, where the rubbery material is prone to failure through chemical attack or aging, for example through oxidation. It is known that the resistance of such rubbery ethylenically unsaturated polymers to chemical attack and aging can be increased by hydrogenation. Reference may be made, for example to the article "Highly saturated nitrile - a new high temperature, chemical resistant elastomer" in *Rubber World*, vol.190, No. 2 at pp. 36–47. Most unexpectedly, it has been found that the oxidation resistance of deuterated polymers is significantly increased over that obtained with the hydrogenated polymer, to a degree not suggested by the earlier Naval Research Laboratory studies on deuterated lubricants.

Although, as indicated earlier, those processes using homogeneous catalyst systems for hydrogenation are preferred for use to prepare deuterated materials according to the present invention, any of the known heterogeneous catalyst systems and processes for hydrogenation may also be used to deuterate those materials for which such catalyst systems and processes have been shown to be effective in hydrogenation. The disclosures of the following patents relate to the hyrogenation of ethylenically unsaturated elastomers, corresponding deuterated analogues of which are comprehended within the present invention:

U.S. Pat. No. 3,700,637 (Finch), describes the hydrogenation of substantially alternating elastomeric copolymers of butadiene or isoprene with acrylonitrile or methacrylonitrile using as hydrogenation catalyst a homogeneous rhodium halide complex of the formula $(R_3E)_3RhX$, wherein X is a halogen (preferably Cl or Br), E is P or As and R is an organogroup having 1–20 C atoms and only aromatic unsaturation.

U.S. Pat. No. 3,898,208 (Krause), describes a process for hydrogenation of oil-insoluble polymers of conjugated dienes containing residual unsaturation, for example styrene-butadiene copolymer, by suppling hydrogen to a dispersed latex of the polymer in a swelling agent, in the presence of a homogeneous hydrogenation catalyst such as tris(triphenyl) chlororhodium.

U.K. Pat. No. 1,558,491 (Bayer A.G.) describes a process for the hydrogenation in solution of copolymers of an $\alpha,\beta$-unsaturated carboxylic acid or a derivative thereof with an unsaturated hydrocarbon containing conjugated double bonds, such as acrylonitrile-butadiene, in the presence of a complex of a monovalent or trivalent rhodium halide as a catalyst and the bound ligand of the complex as co-catalyst, for example $[(C_6H_5)_3P]_3RhCl$ catalyst with co-catalyst $(C_6H_5)_3P$.

U.S. Pat. Nos. 4,337,329; 4,384,081; and 4,452,951 (Kubo et al.), describe heteroeneous catalyst systems for use in the hydrogenation of conjugated diene polymers, particularly polyisoprene and natural rubber, polybutadiene, NBR, and SBR.

U.S. Pat. Nos. 4,464,515 and 4,503,196 (Rempel et al.), describe catalyst/co-catalyst systems useful in the selective hydrogenation in solution of the C=C bonds in copolymers of a conjugated diene and copolymerizable monomer, for example block copolymers of butadiene and styrene.

Published U.K. Patent Application No. 2,070,023A (Johnson Matthey & Company), describes a catalyst system and process for the hydrogenation of unsaturated organic materials such as ABS-type copolymers.

U.S. Pat. No. 4,452,950 (Wideman), like aforementioned No. 3,898,208, describes a process for hydrogenating unsaturated rubbers in latex form. Rubbers such as polyisoprene, polybutadiene, SBR, NBR, natural rubber, butadiene-isoprene copolymer or isoprene-isobutylene copolymer may be selectively hydrogenated.

The above-mentioned U.S. Pat. Nos. 3,700,637; 3,898,208; 4,337,329; 4,384,081; 4,452,951; 4,464,515; 4,503,196; and 4,452,950; U.K. Patent No. 1,558,491 and published U.K. patent application No. 2,070,023A are hereby incorporated by reference for their disclosures of various methods for the hydrogenation of elastomeric addition copolymers of vinyl monomers and 1,3-conjugated dienes.

EXPERIMENTAL EXAMPLE (i) Deuteration Process

Figure 1:
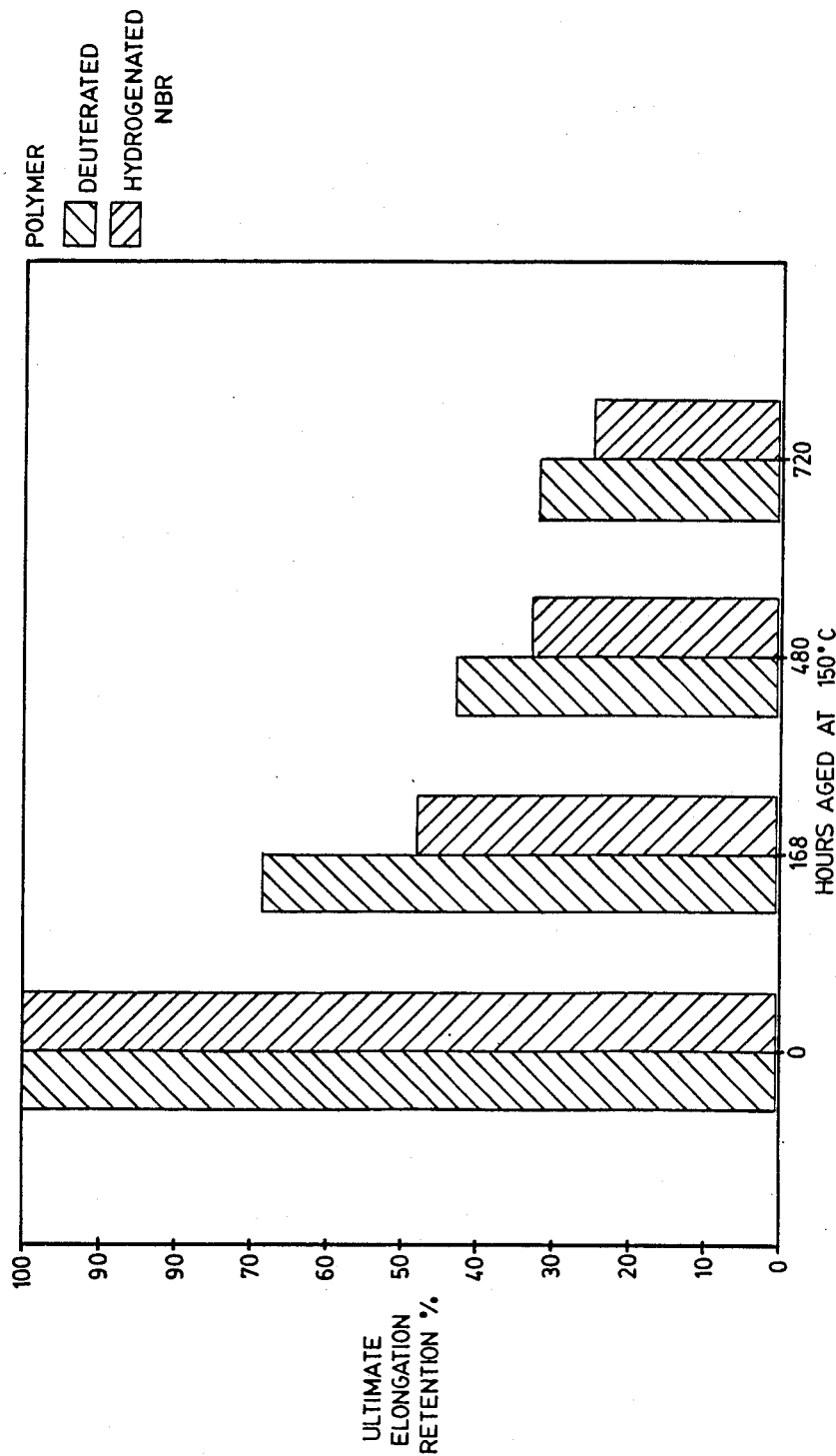
FIG. 1 is a bar graph comparing the percent of ultimate elongation retained at break between deuterated and hydrogenated NBR samples aged at 150° C.

An acrylonitrile-butadiene copolymer, PERBUNAN N3810 (Bayer Co.) (50 g) was dissolved in chlorobenzene (1500 ml) under an inert atmosphere ($N_2$ or Ar) and subsequently transferred to a two liter glass-lined autoclave. The autoclave was assembled and $N_2$ was bubbled through the solution while stirring for 10 minutes. The autoclave was pressurized to 0.35 MPa for 5 minutes. The pressure was released and the autoclave opened briefly for addition of catalyst $RhCl[P(C_6H_5)_3]_3$ 0.2 g, and co-catalyst $P(C_6H_5)_3$ 2.0 g. The autoclave was closed and again $N_2$ was bubbled through the solution for 5 minutes. The autoclave was pressurized with Dhdb 2 gas to 1.38 MPa for 5 minutes. The pressure was then released and reset at 3.45 MPa. Stirring was initiated and the mixture heated to 150° C. and the reaction was allowed to proceed.

Samples were withdrawn during the experiment and were analysed by $^1HNMR$ for the extent of carbon-carbon double bond saturation. The complete deuteration of unsaturated carbon-carbon double bonds was realized in about 5 hours. The final product mixture was diluted with an equal amount of acetone and separated by isopropanol (4000 ml). The product was decanted, washed with further isopropanol (3×500 ml) and dried under vacuum at 50° C.

The $^1$HNMR of the final product indicated that 100 percent deuteration of the carbon-carbon double bond had been achieved and $^{13}$C{$^1$H}NMR, IR indicated that no deuteration of the nitrile groups present in the polymer had taken place. The IR spectrum also showed the shift in C-D stretchings indicating the incorporation of deuterium in the product.

Smaller amounts of catalyst/co-catalyst and a lower reaction temperature than those indicated above could be employed. The more extreme conditions were chosen to ensure as complete deuteration of the product as possible.

A separate 50 g sample of PERBUNAN N3810 was hydrogenated using the same preparative technique, but with $H_2$ in place of $D_2$. Again, it was spectrally determined that 100 percent hydrogenation of the carbon-carbon double bond had been achieved and that no hydrogenation of the nitrile groups had taken place.

Table 1 below lists the various polymers/copolymers containing carbon-carbon unsaturation which have been deuterated along with the atom percents and weight percentages of deuterium in the resulting product. Although deuteration levels may be varied by changing reaction times and conditions, deuteration to a level of at least about 50 percent of theoretical is required to obtain an appreciable improvement in properties over the untreated polymer.

TABLE 1

| Polymer/Copolymer | Percent Deuteration | % D/H + D | % D by Weight |
|---|---|---|---|
| PERBUNAN N38.10 (Bayer) acrylonitrile-butadiene copolymer containing 62% butadiene | 100 | 20 | 4.3 |
| AMERPOL 1502, B.F. Goodrich - a styrene-butadiene copolymer containing 76% butadiene | 100 | 19 | 5.8 |
| KRATON 1101, Shell a styrene-butadiene-styrene block copolymer containing 67% butadiene | 100 | 17 | 5.5 |
| Cis-Polybutadiene | 100 | 25 | 6.9 |
| Natural Rubber | 85 | 17 | 4.8 |

In diene/vinyl monomer copolymers, the polymer property exhibiting the greatest effect on final vulcanizate properties is the vinyl monomer content. As a general rule, at least 40 percent of the polymer units must be diene for the vulcanizate to be elastomeric in physical properties and useful as a rubber.

(ii) - Compounding and Physical Testing

Deuterated NBR and hydrogenated NBR samples prepared as above were compounded on a 6 × 12 rubber mill using the base recipe shown in Table 2. They were cross-linked by a radical mechanism because molecular chain of the materials are entrely saturated. This was achieved by using the peroxide-coagent as shown in Table 2.

TABLE 2

| Polymer | 100.0 |
|---|---|
| N550 Black | 50.0 |
| Magnesium Oxide[a] | 10.0 |
| Zinc Oxide | 5.0 |
| Stearic Acid | 1.0 |
| Substituted Diphenylamine[b] | 2.67 |
| 2-Mercaptotolyimidazole[c] | 2.0 |
| 1:2 Polybutadiene (65%)[d] | 10.0 |
| Peroxide[e] | 6.5 |

[a]Maglite K-Whittaker, Clark & Daniels
[b]Agerite Superflex G (75% actaive) - Vanderbilt
[c]Vanox MTI-Vanderbilt
[d]Ricon 153D - Colorado Chemical Specialties Inc.
[e]Varnox DBPH-50-Vanderbilt (iii) Oxidative Aging Resistance Air aging was carried out according to the ASTM D-573-81, "Rubber-Deterioration in an Air Oven". The peroxide vulcanizate was aged at two temperatures, 150° C. and 160° C. The physical testing results for deuterated and hydrogenated NBR of unaged and aged samples at 150° C. and 160° C. are summarized in Tables 3 and 4.

TABLE 3

| | Hours Aged | | | | | | | |
|---|---|---|---|---|---|---|---|---|
| | 0 | | 168 | | 480 | | 720 | |
| | D-NBR | H-NBR | D-NBR | H-NBR | D-NBR | H-NBR | D-NBR | H-NBR |
| Hardness, Shore A Type 2[a] | 80 | 76 | 88 | 87 | 89 | 90 | 92 | 92 |
| Points Change[b] | 0 | 0 | +8 | +11 | +9 | +14 | +12 | +16 |
| 100% Modulus, MPa | 7.7 | 7.4 | 18.2 | 18.8 | — | — | — | — |
| % Change | 0 | 0 | +136 | +154 | — | — | — | — |
| Tensile Strength, MPa | 20.8 | 25.1 | 25.2 | 24.8 | 24.4 | 26.1 | 23.0 | 24.5 |
| Elongation at Break, % | 220 | 300 | 150 | 145 | 95 | 100 | 70 | 75 |
| % Change | 0 | 0 | −32 | −52 | −57 | −67 | −68 | −75 |

[a]5 Second reading
[b]from original hardness

TABLE 4

| | Hours Aged | | | | | |
|---|---|---|---|---|---|---|
| | 0 | | 24 | | 48 | |
| | D-NBR | H-NBR | D-NBR | H-NBR | D-NBR | H-NBR |
| Hardness Shore A Type 2[a] | 80 | 76 | 85 | 81 | 88 | 83 |
| Points Change[b] | 0 | 0 | +5 | +5 | +8 | +7 |
| 100% Modulus, MPa | 7.7 | 7.4 | 14.0 | 13.4 | 16.0 | 15.7 |
| % Change | 0 | 0 | +82 | +81 | +107 | +112 |
| Tensile Strength, MPa | 20.8 | 25.1 | 26.1 | 28.0 | 25.4 | 27.8 |
| % Change | 0 | 0 | +25.5 | +11.5 | +22 | +10.7 |
| Elongation at Break % | 220 | 300 | 190 | 220 | 170 | 195 |

TABLE 4-continued

| | | | | | | |
|---|---|---|---|---|---|---|
| % Change | 0 | 0 | −13.6 | −26.6 | −22.7 | −35 |

| | Hours Aged | | | | | |
|---|---|---|---|---|---|---|
| | 72 | | 120 | | 216 | |
| | D-NBR | H-NBR | D-NBR | H-NBR | D-NBR | H-NBR |
| Hardness Shore A Type 2[a] | 88 | 86 | 90 | 88 | 90 | 88 |
| Points Change[b] | +8 | +10 | +10 | +12 | +10 | +12 |
| 100% Modulus, MPa | 16.7 | 16.6 | 19.2 | 19.1 | 20.2 | 20.0 |
| % Change | +116 | +124 | +149 | +158 | +162 | +170 |
| Tensile Strength, MPa | 26.2 | 25.4 | 25.8 | 27.3 | 23.3 | 25.9 |
| % Change | +26.0 | +1 | +24 | +7 | +12 | +3 |
| Elongation at Break % | 175 | 170 | 150 | 155 | 125 | 135 |
| % Change | −20.5 | −43 | −32.0 | −48 | −43 | −55 |

[a] 5 Second reading
[b] From original hardness

Figure 2:
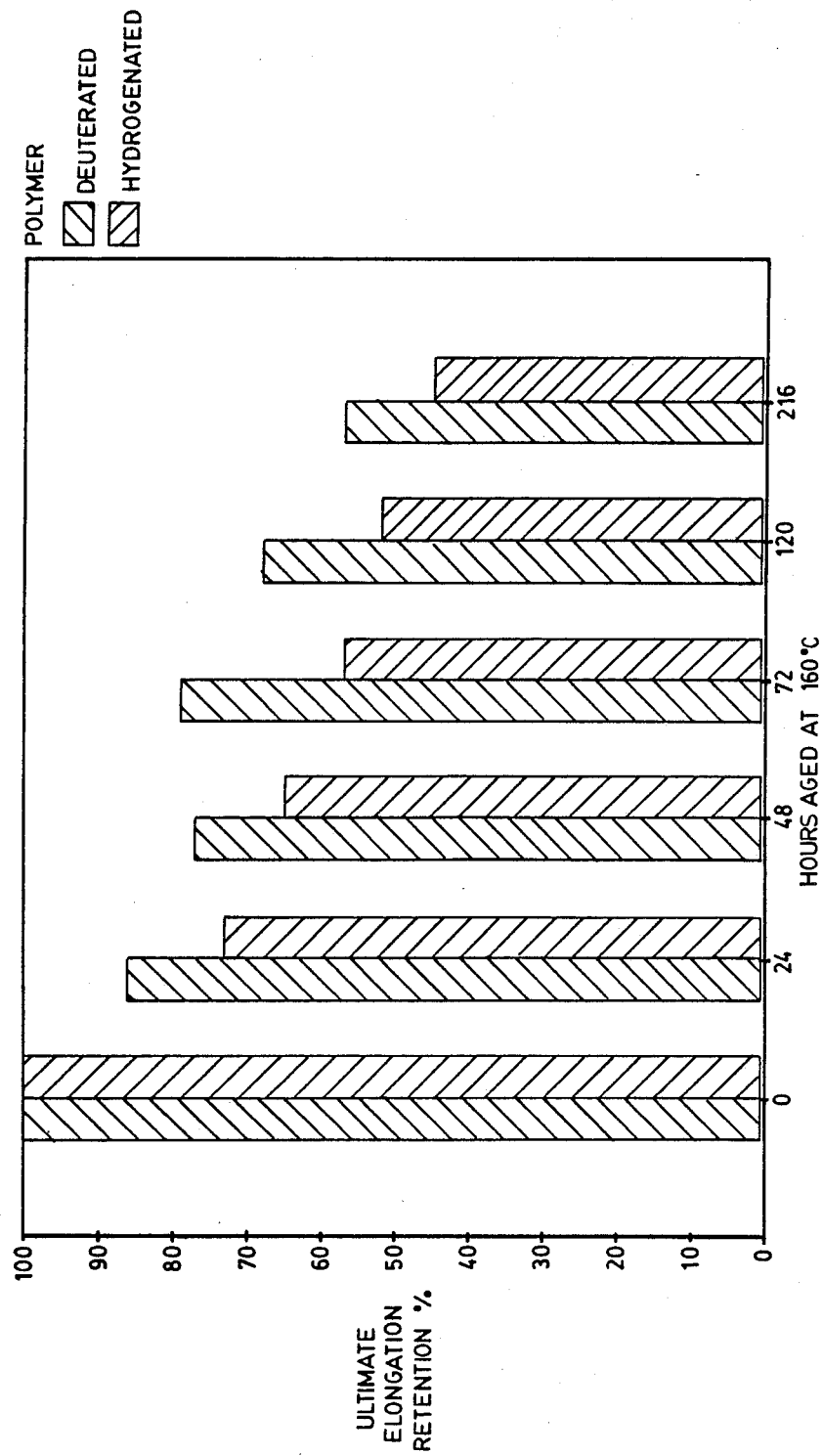
FIG. 2 is a bar graph comparing the percent of ultimate elongation retained at break between deuterated and hydrogenated NBR samples aged at 160° C.

The retention of elongation of peroxide vulcanization after air aging at 150° C. and 160° C., corresponding to the "Percent Change" data in Tables 3 and 4, are shown in FIGS. 1 and 2, respectively. As can be seen from these figures the deuterated NBR samples show superior high temperature resistance both at 150° C. and 160° C.

The difference between deuterated NBR and hydrogenated NBR appears to be greater at 160° C. For example, at 160° C. hydrogenated NBR has lost 30 percent of its original elongation after about 40 hours but a similar drop for deuterated NBR is evident only after 120 hours of aging. After 216 hours of aging, the deuterated NBR has lost 43 percent of its ultimate elongation, compared with 55 percent for the hydrogenated NBR. These data reflect a substantial increase in deuterated NBR oxidative stability over hydrogenated NBR. In general, deuterated NBR appears to withstand these accelerated aging conditions at least twice as long as hydrogenated NBR.

Both deuterated and hydrogenated NBRs showed excellent ozone resistance. It is possible that deuterated NBR may also withstand longer exposure to ozone than hydrogenated NBR if standard test time is extended. However, the significant improvements observed in heat aging point to deuterated NBR a new specialty elastomer with much wider heat resistance capabilities than hitherto available.

I claim:

1. An elastomeric addition copolymer of vinyl monomer 1,3-conjugated diene, said copolymer being deuterated to saturate between about 50 percent and about 100 percent of the polymer backbone and side-chain ethylenic double bonds from the diene units incorporated in the copolymer and wherein essentially only the ethylenic double bonds are deuterated.

2. A copolymer according to claim 1, wherein said vinyl monomer is selected from the group consisting of acrylonitrile, styrene and mixtures of same.

3. A copolymer according to claim 1, wherein said 1,3-conjugated diene is selected from the group consisting of butadiene, isoprene, and neutral rubber.

4. A copolymer according to claim 1, wherein the percentage of 1,3-conjugated diene in said copolymer is at least about 40 mole percent.

5. Deuterated polybutadiene, wherein between about 50 percent and about 100 percent of the ethylenic double bonds have been saturated by addition of deuterium and wherein essentially only the ethylenic double bonds are deuterated.

6. Deutrated polyisoprene, wherein between about 50 percent and about 100 percent of the ethylenic double bonds have been saturated by addition of deterium and wherein essentially only the ethylenic double bonds are deuterated.

7. A vulcanized product made from a copolymer according to claim 4.

8. A process for preparing an elastomeric polymer comprising the step of adding deuterium to essentially only the ethylenic double bonds of an elastomeric polymeric material selected from the group consisting of polybutadiene, polyisoprene, acrylonitrile-butadiene copolymers, styrene-butadiene copolymers, styrene-butadiene-styrene block copolymers, and acrylonitrile-styrenebutadiene copolymers to saturate between about 50 percent and about 100 percent of said ethylenic double bonds.

9. A process according to claim 8, wherein the addition of deuterium is carried out by heating the solution of said elastomeric polymeric material in a suitable organic solvent containing a catalyst, in the presence of pressurized deuterium gas.

10. A process according to claim 9, wherein said catalyst comprises $RhCl[P(C_6H_5)_3]_3$ and $P(C_6H_5)_3$ co-catalyst.

* * * * *